(12) United States Patent
Hsu

(10) Patent No.: US 6,766,588 B1
(45) Date of Patent: Jul. 27, 2004

(54) DRIVE-TYPE TAPE RULE

(76) Inventor: Cheng-Hui Hsu, No.126, Pao Chung Road, Hsin Tien City, Taipei Hsien (TW)

( * ) Notice: Subject to any disclaimer, the term of this patent is extended or adjusted under 35 U.S.C. 154(b) by 0 days.

(21) Appl. No.: 10/619,442

(22) Filed: Jul. 16, 2003

(51) Int. Cl.$^7$ ................................................. G01B 3/10
(52) U.S. Cl. ............................ 33/755; 33/761; 242/375
(58) Field of Search ...................... 33/755, 761, 769, 33/764, 414; 242/375, 375.2, 376

(56) References Cited

U.S. PATENT DOCUMENTS

| | | | | |
|---|---|---|---|---|
| 3,301,503 A | * | 1/1967 | Browning | 242/376 |
| 4,982,910 A | * | 1/1991 | Bickford | 242/375 |
| 5,060,883 A | * | 10/1991 | Ohya et al. | 242/373 |
| 5,377,626 A | * | 1/1995 | Kilsby et al. | 119/796 |
| 5,531,395 A | * | 7/1996 | Hsu | 242/381.6 |
| 5,920,997 A | * | 7/1999 | Girtman | 33/414 |
| 6,612,046 B1 | * | 9/2003 | Cimorell et al. | 33/668 |

FOREIGN PATENT DOCUMENTS

JP          06180201 A  *  6/1994  ............ G01B/3/10

* cited by examiner

*Primary Examiner*—Christopher W. Fulton
*Assistant Examiner*—Amy R. Cohen
(74) *Attorney, Agent, or Firm*—Rosenberg, Klein & Lee

(57) ABSTRACT

A drive-type tape ruler in which a spring disposed within the blade take-up spool constitutes a spring-loaded wheel that is installed at one or two sides of the blade take-up spool, enabling the blade take-up spool to accommodate the winding of a tape ruler blade that is approximately 2 to 2.5 times lengthier than possible with a conventional blade take-up spool of the same diameter and, furthermore, the torque of the spring-loaded wheel rewinds the tape ruler blade, thereby enhancing tape ruler utility and performance.

1 Claim, 3 Drawing Sheets

DRIVE-TYPE TAPE RULE

BACKGROUND OF THE INVENTION

1) Field of the Invention

The invention herein relates to measuring instruments, specifically a drive-type tape rule wherein a spring disposed inside the blade take-up spool constitutes a spring-loaded wheel that is installed at one or two sides of the blade take-up spool, enabling the blade take-up spool to accommodate the winding of a tape ruler blade that is approximately 2 to 2.5 times longer than that possible with a conventional blade take-up spool of the same diameter and, furthermore, the torque of the spring-loaded wheel rewinds of the tape ruler blade, thereby enhancing tape rule utility and performance.

2) Description of the Prior Art

A conventional tape rule utilizing an internal blade take-up spool consists of a concentric spring at the center and a tape ruler blade wound around the exterior, a hook riveted to the front end of the tape ruler blade, and a center shaft projecting from the inner side of a left case half for inserting the center section of the spring in the blade take-up spool; screws are respectively inserted through mounting holes in the right case half on the other side and fastened to the center shaft and mounting posts of the left case half to thereby assembly the said tape rule. Evaluating the structure of the conventional tape rule, since there is a concentric spring centrally coiled in the said blade take-up spool, the said spring occupies space at the center of the blade take-up spool, and the remaining space is used for winding the tape ruler blade, a conventional tape ruler blade can only be a length of approximately 5 to 7.5 meters; additionally, extending the length of the tape ruler blade requires an increase in the diameter of the blade take-up spool and, at the same time, when the tape ruler blade is utilized for measurements and pulled out longer distances, the rewinding torque of the spring must be considered in that additional space will be needed to fit a stronger spring; however, to meet ergonomic concerns, since the maximum dimensions of the tape rule case is limited to what the average hand is capable of grasping, increasing the diameter of the blade take-up spool is difficult. As a result, to facilitate tape rule usage, the applicant of the invention herein conducted extensive research and development based on many years of specialized production experience to further enhance the practical value of the invention herein which following repeated testing and refinement culminated in the drive-type tape rule of the present invention.

SUMMARY OF THE INVENTION

Therefore, the primary objective of the invention herein is to provide a drive-type tape rule in which a spring-loaded wheel is installed in one or two sides of the blade take-up spool, enabling the tape ruler to have case dimensions that facilitate manual grasping in accordance with ergonomic principles, the said blade take-up spool has the capacity to wind a tape ruler blade of greater length that is approximately 2 to 2.5 times longer and, furthermore, the spring-loaded wheel provides torque to rewind the tape ruler blade, thereby enhancing tape ruler utility and performance.

To enable the examination committee a further understanding of the structural features, innovative content, and advantages of the invention herein, the brief description of the drawings below are accompanied by the detailed description of the embodiments.

DETAILED DESCRIPTION OF THE INVENTION

Figure 1:
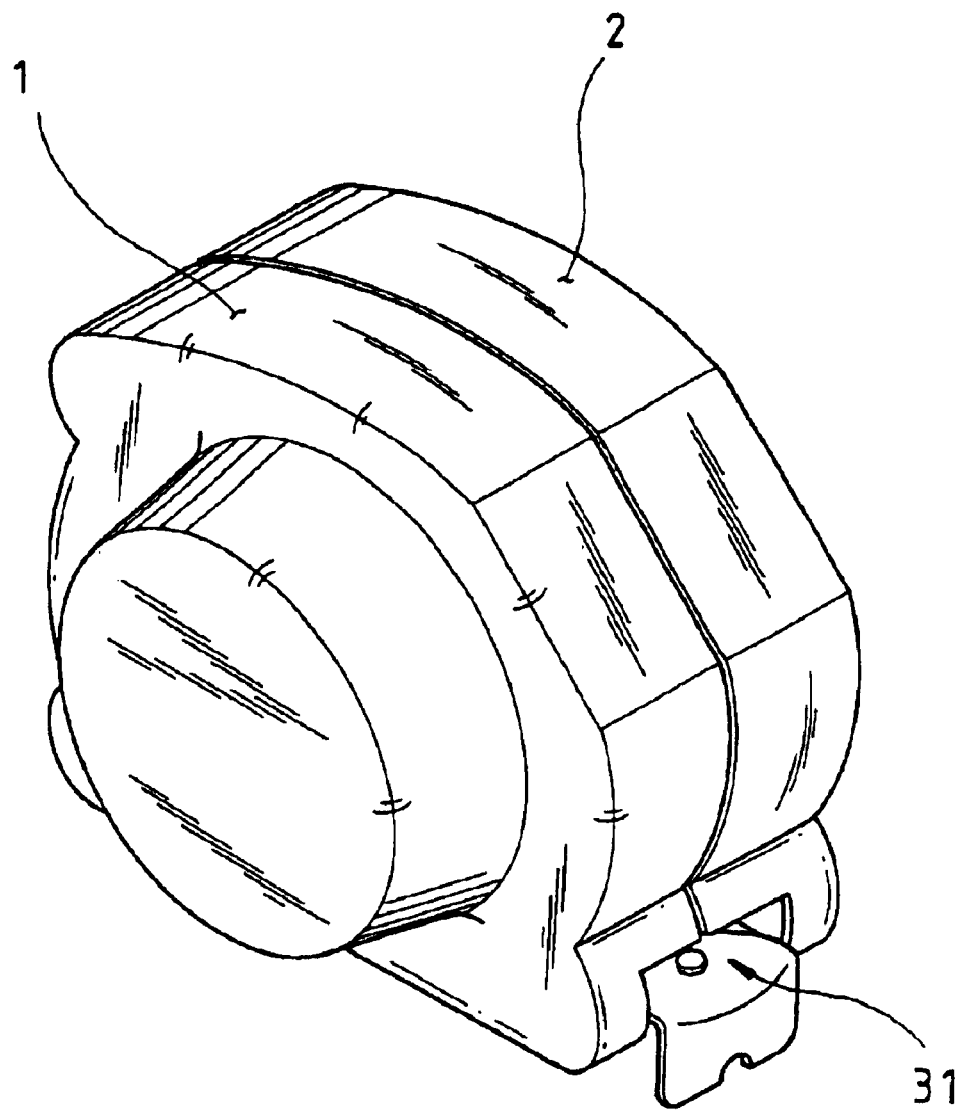
FIG. 1 is an isometric drawing of the invention herein.
Figure 2:
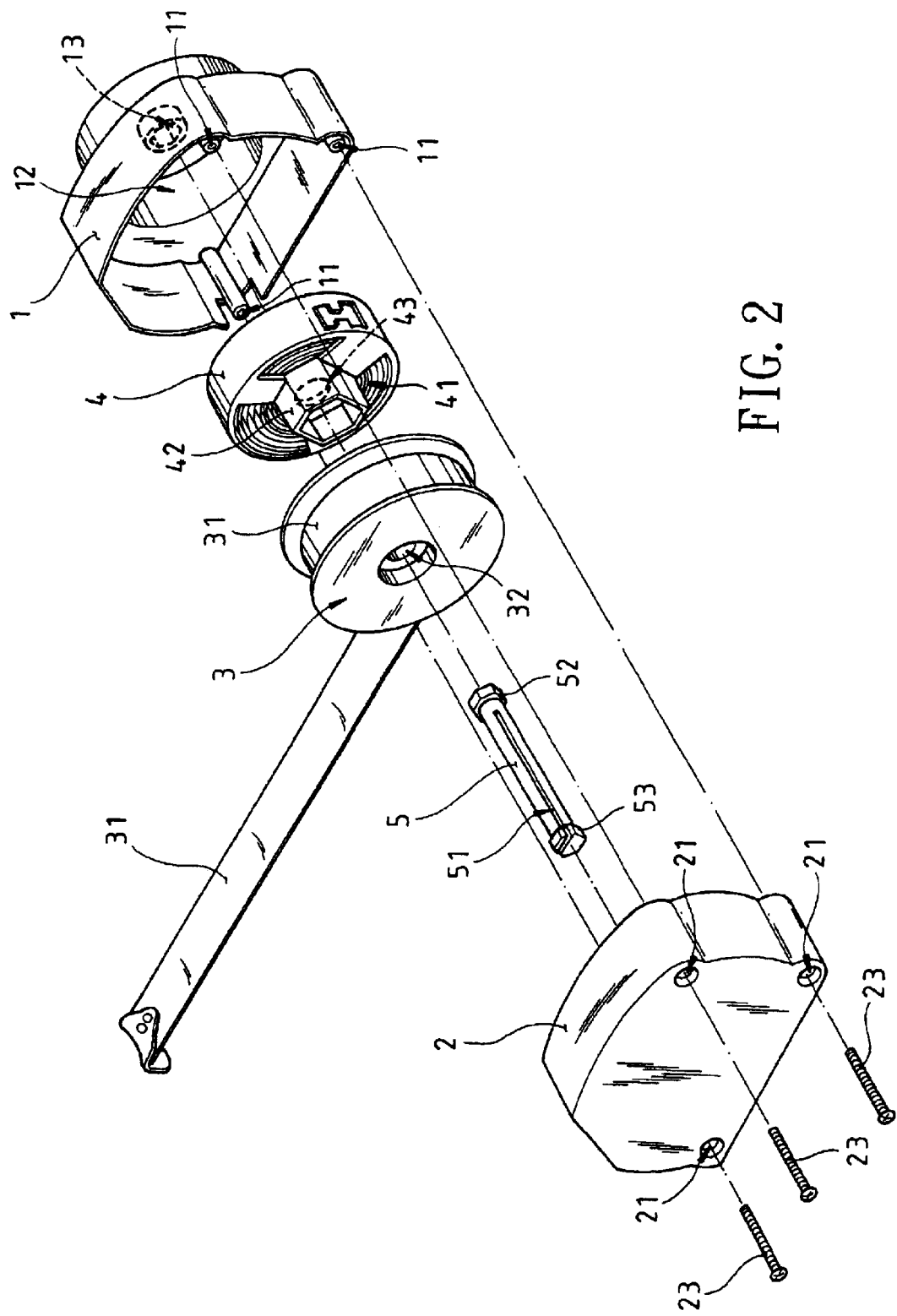
FIG. 2 is an exploded drawing of the invention herein.
Figure 3:
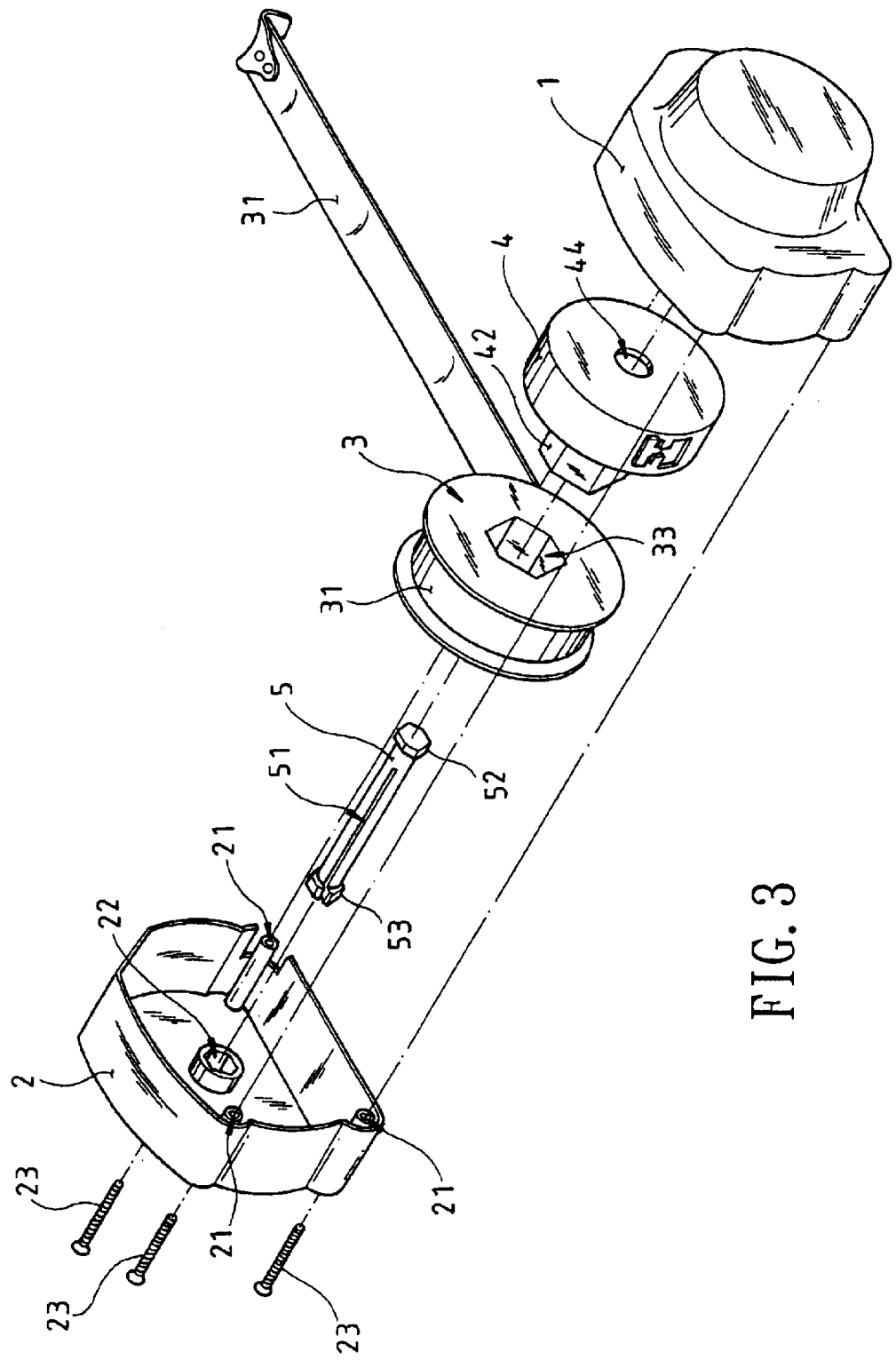
FIG. 3 is an exploded drawing of the invention herein.

Referring to FIG. 1, FIG. 2, and FIG. 3, the drive-type tape rule of the invention herein is comprised of a left case half 1, a right case half 2, a blade take-up spool 3, a spring-loaded wheel 4, and a stationary shaft 5, wherein:

The left case half 1 is of one-piece plastic construction; a plurality of mounting posts 11 are disposed along the interior periphery of the said left case half 1 and, furthermore, a circular recess 12 is contoured into the center of the said left case half 1, and a journal bearing 13 is formed at the center of the said recess 12.

The right case half 2 is of one-piece plastic construction; a plurality of mounting holes 21 are disposed along the interior periphery of the said right case half 2 and, furthermore, a journal bearing 22 is formed at the center of the said right case half 2.

The blade take-up spool 3 has a ruler blade 31 wound around it; a circular hole 32 is disposed in one side of the said blade take-up spool 3 and a hexagonal socket 33 is formed in its opposite side.

The spring-loaded wheel 4 contains an internal concentric spring 41, a columnar hexagonal drive member 42 projects from one side of the said spring-loaded wheel 4 and, furthermore, a circular opening 43 is formed through the bottom section of the drive member 42 and another circular opening 44 is formed in the center at the opposite side of the said spring-loaded wheel 4.

The stationary shaft 5 is a slender rod having a lengthwise slot 51, with an hexagonal end fitting 52 and 53 respectively disposed at the two extremities of the said stationary shaft 5.

The stationary shaft 5 is inserted through the circular hole 32 in one side of the said blade take-up spool 3 as well as the hexagonal socket 33 in its opposite side and, furthermore, through the circular openings 43 and 44 of the spring-loaded wheel 4, the end fitting 52 at one extremity of the stationary shaft 5 is nested in the journal bearing 13 of the left case half 1, and the innermost end of the internal concentric spring 41 of the spring-loaded wheel 4 is secured into the lengthwise slot 51 of the stationary shaft 5; the drive member 42 at one side of the said spring-loaded wheel 4 engages the hexagonal socket 33 in one side of the blade take-up spool 3, the right case half 2 and the left case half 3 are brought together, and the end fitting 53 at the other extremity of the said stationary shaft 5 is nested in the journal bearing 22 of the right case half 2; a plurality of screws 23 are respectively inserted through the mounting holes 21 of the right case half 2 and then fastened in the mounting posts 11 to complete the assembly of the tape ruler structure of the present invention.

In the arrangement of the structural components comprising the invention herein, the spring-loaded wheel 4 is installed in one side of the blade take-up spool 3, enabling the tape ruler to have case dimensions that facilitate manual grasping in accordance with ergonomic principles, the said blade take-up spool 3 has the capacity to wind a tape ruler blade 31 of greater length that is approximately 2 to 2.5 times longer than conventionally accommodated and, furthermore, the spring-loaded wheel 4 provides torque to rewind the tape ruler blade 31, thereby enhancing tape ruler utility and performance.

The spring-loaded wheel 4 of the invention herein can be symmetrically installed in both the left and right sides of the blade take-up spool 3.

Additionally, the blade take-up spool 3 and the spring-loaded wheel 4 of the invention herein are separately fabricated and then assembled; with the blade take-up spool inside a conventional tape rule, a concentric spring is first installed at the center of the blade take-up spool and a tape ruler blade is wound around it; during the manufacturing process, both the production and assembly of the conventional tape rule consume more time and labor costs; furthermore, since the blade take-up spool 3 and the spring-loaded wheel 4 are individually made and then later collocated, this approach additionally facilitates product assembly and precision, providing for industrial practical value.

In summation of the foregoing section, since the invention herein improves upon the shortcomings of the conventional product, is original in terms of utility among products in the same category and, furthermore, its disclosed structure is capable of achieving the claimed objectives, the present invention is submitted for review and the granting of the commensurate patent rights.

What is claimed is:

1. A drive-type tape rule, the said drive-type tape ruler comprised of a left case half, a right case half, a blade take-up spool, a spring-loaded wheel, and a stationary shaft, wherein:

said left case half is of one-piece plastic construction; a plurality of mounting posts are disposed along the interior periphery of the said left case half and, furthermore, a circular recess is contoured into the center of the said left case half, and a journal bearing is formed at the center of the said recess;

said right case half is of one-piece plastic construction; a plurality of mounting holes are disposed along the interior periphery of the said right case half and, furthermore, a journal bearing is formed at the center of the said right case half;

said blade take-up spool has a tape ruler blade wound around it; a circular hole is disposed in one side of the said blade take-up spool and a hexagonal socket is formed in its opposite side;

said spring-loaded wheel contains an internal concentric spring, a columnar hexagonal drive member projects from one side of the said spring-loaded wheel and, furthermore, a circular opening is formed through the bottom section of the said drive member and another circular opening is formed in the center at the opposite side of the said spring-loaded wheel;

said stationary shaft is a slender rod having a lengthwise slot, with a polygonal end fitting respectively disposed at the two extremities of the said stationary shaft;

said stationary shaft is inserted through the said circular hole in one side of the said blade take-up spool as well as the said hexagonal socket in its opposite side and, furthermore, through the said circular openings of the said spring-loaded wheel, the said end fitting at one extremity of the said stationary shaft is nested in the said journal bearing of the said left case half, and the innermost end of the said internal concentric spring of the said spring-loaded wheel is secured into the said lengthwise slot of the said stationary shaft; the said drive member at one side of the said spring-loaded wheel engages the said hexagonal socket in one side of the said blade take-up spool, the said right case half and the said left case half are brought together, and the said end fitting at the other extremity of the said stationary shaft is nested in the said journal bearing of the said right case half; a plurality of screws are respectively inserted through the said mounting holes of the said right case half and then fastened in the said mounting posts to complete the assembly of the tape rule structure of the present invention.

* * * * *